United States Patent
Garrec et al.

(10) Patent No.: US 10,090,871 B2
(45) Date of Patent: Oct. 2, 2018

(54) CONSUMPTION MANAGEMENT METHOD, AND RECEIVING CHAIN FOR IMPLEMENTING SUCH A METHOD

(71) Applicant: THALES, Courbevoie (FR)

(72) Inventors: Patrick Garrec, Merignac (FR); Jean-Philippe Plaze, Bois D'Arcy (FR); Benoit Mallet Guy, Pessac (FR)

(73) Assignee: THALES, Courbevoie (FR)

( * ) Notice: Subject to any disclaimer, the term of this patent is extended or adjusted under 35 U.S.C. 154(b) by 310 days.

(21) Appl. No.: 14/916,954

(22) PCT Filed: Oct. 14, 2014

(86) PCT No.: PCT/EP2014/071947
§ 371 (c)(1),
(2) Date: Mar. 4, 2016

(87) PCT Pub. No.: WO2015/058994
PCT Pub. Date: Apr. 30, 2015

(65) Prior Publication Data
US 2016/0233900 A1 Aug. 11, 2016

(30) Foreign Application Priority Data

Oct. 25, 2013 (FR) ..................... 13 02474

(51) Int. Cl.
*G01S 13/82* (2006.01)
*H04B 1/10* (2006.01)
*G01S 7/40* (2006.01)

(52) U.S. Cl.
CPC ............ *H04B 1/109* (2013.01); *G01S 7/4021* (2013.01)

(58) Field of Classification Search
CPC .............................. G01S 7/4021; H04B 1/109
(Continued)

(56) References Cited

U.S. PATENT DOCUMENTS

2005/0026564 A1   2/2005   Haub et al.
2005/0104766 A1   5/2005   Bandhauer
(Continued)

FOREIGN PATENT DOCUMENTS

WO   2008/106354 A2   9/2008

*Primary Examiner* — Timothy A Brainard
(74) *Attorney, Agent, or Firm* — Baker & Hostetler LLP

(57) ABSTRACT

A method managing the energy consumption of at least one electronic component in a radar reception chain, comprises a preliminary step of formulating a table containing values representative of the power level of received signals, each value being contained in a bin addressed by a triplet formed of a quantity corresponding to a measurement of the power level of a signal received from a target, of a quantity corresponding to the distance of the target and of a quantity corresponding to the azimuth of the target, the method performing for each received signal, arising from a radar recurrence of order n, the following steps: a step of reading a measurement of the power level of the received signal; a step of addressing the table as a function of the measurement, distance and azimuth of the target, a first power level value then being addressed; a step of extrapolating the power level of the next received signal arising from the following radar recurrence of order n+1, dependent on the first value and on a given number of values of the table addressed by sliding of addresses from the address of the first value according to the power level measurement addresses, the given number being dependent on the speed of the carrier of the reception chain, the step being applied for the received signal of order n+1, the setpoint value of the consumption being dependent at least on the extrapolation of the power level received and the position of the target.

11 Claims, 3 Drawing Sheets

(58) Field of Classification Search
USPC .......................................................... 342/91
See application file for complete search history.

(56) References Cited

U.S. PATENT DOCUMENTS

2010/0171659 A1   7/2010  Waters et al.
2014/0169252 A1*  6/2014  Banerjee ................. H04W 4/02
                                                  370/311

* cited by examiner

CONSUMPTION MANAGEMENT METHOD, AND RECEIVING CHAIN FOR IMPLEMENTING SUCH A METHOD

CROSS-REFERENCE TO RELATED APPLICATIONS

This application is a National Stage of International patent application PCT/EP2014/071947, filed on Oct. 14, 2014, which claims priority to foreign French patent application No. FR 1302474, filed on Oct. 25, 2013, the disclosures of which are incorporated by reference in their entirety.

FIELD OF THE INVENTION

The present invention relates to a method for managing the energy consumption of electronic components in an electromagnetic signals reception chain. It also relates to a reception chain implementing such a method. The invention applies especially in respect of low noise amplifiers and diverse electronic reception units, for example in radars or telecommunication systems. It relates particularly to multifunction antenna systems and electronic-scanning antennas or arrays. More generally, the invention applies to all amplification devices at reception when optimization of energy consumption is sought.

BACKGROUND

In reception chains, Low Noise Amplifiers, subsequently called LNAs, pose energy consumption problems. Their significant consumption is mainly related to linearity requirements. One reason for the need for linearity resides in the necessity to limit the saturation as well as the harmonics and the modulation products related to these saturations and non-linearities.

The harmonics are the frequency multiples of the strong signals at n times the initial frequency. In the wideband case these parasitic signals are contained in the useful bandwidth and are troublesome in respect of the processing of the reception output signal. The other known problems are the intermodulation products which are generated in case of non-linearity. They occur in the presence of two weakly frequency-spaced signals. The measurement of these products is characterized by a polynomial expansion based on Taylor series, the third order corresponding to the third product of the Taylor series. The measurement is characterized by this third order and is known by the name IP3 or TOI (Third Order Intercept).

In the case of a wideband amplifier, for example with a ratio of 4, the reception of a strong signal $F_0$ and of a weak signal at another frequency generates harmonics related to distortion, which distortion is caused by the non-linearity of the amplifier. The non-linearity can then be likened to a mixer and may give products of mixing between the frequency of the strong signal and the harmonics: $F_0+f_1$, $F_0+2f_1$, ... $F_0+nf_1$, .... The more significant the bandwidth, the more significant the effect will be.

An operational necessity of LNAs is their robustness in the face of external assaults. The effects of these assaults are often limited by the technology used and the value of the supply voltage. The more significant the supply voltage, the more resistant is the component but the more energy it consumes. This consumption is related to the class of the amplification and to the currents and voltages employed to avoid saturations in the presence of high currents.

The technologies which allow wideband reception and a significant dynamic range are recent, a significant dynamic range corresponding to a wide span of operating values at the input of the LNA. However, these technologies consume a great deal of current if linearity is desired over the whole of the frequency band.

The use of logarithmic amplifiers in radar detectors makes it possible to obtain significant dynamic ranges to the detriment of linearity.

The use of narrowband amplifiers makes it possible to obtain linearities over significant operating spans without being disturbed by the echoes of the harmonics of order 2 and higher, or out-of-useful-band signals.

The need to have multifunction systems, especially so as to minimize antenna apertures, is now a necessity so as to compact the probes. Advances in technology are making it possible to amplify signals occupying a wide frequency band and of large dynamic range.

However, a price to be paid for marrying these two advantages is the consumption of the LNAs which tends to become very considerable when in the presence of an array antenna and when there are as many LNAs as active modules. It is even possible to reach a paradox in the fact that the reception part consumes more than the emission part.

SUMMARY OF THE INVENTION

An aim of the invention is in particular to allow the use of LNAs and other circuits of a reception chain benefiting from a wide frequency band and a large dynamic range while limiting the energy consumption. For this purpose, the subject of the invention is a method for managing the energy consumption of at least one electronic component in a radar reception chain, said method comprising a preliminary step of formulating a table containing values representative of the power level of received signals, each of said values being contained in a bin addressed at least by a triplet formed of a quantity corresponding to a measurement of the power level of a signal received from a target, of a quantity corresponding to the distance of said target and of a quantity corresponding to the azimuth of said target, said method performing for each received signal, arising from a radar recurrence of order n, the following steps:

a step of reading of a measurement of the power level of the received signal;

a step of addressing said table as a function of said measurement, of the distance and of the azimuth of said target, a first power level value then being addressed;

a step of extrapolating the power level of the next received signal arising from the following radar recurrence of order n+1, dependent on said first value and on a given number of values of said table addressed by sliding of addresses from the address of said first value according to the power level measurement addresses, said given number being dependent on the speed of the carrier of said reception chain, said step being applied for the received signal of order n+1, the setpoint value of the consumption of said at least being dependent at least on the extrapolation of the power level received and the position of said target.

The signals being received by recurrences, per burst and/or per revolution of antenna coupled to said reception chain, said table comprises for example values representative of the power level of signals received in the previous recurrence, in the previous burst and/or in the previous antenna revolutions.

In a particular mode of implementation, the quantities of the triplet being sampled values of measurement, of distance and of azimuth.

The addresses are for example shifted in distance and in azimuth according to the motions of the carrier of said reception chain.

The extrapolation is for example equal to the mean amplitude of the first addressed value and of the M values addressed by address sliding, increased by K times the standard deviation.

The consumption setpoint is for example determined by the setpoint of the supply voltage of said component and/or by the setpoint of the bias current of said component.

The power supply of said at least component is for example set to zero when said power level exceeds a given threshold.

The subject of the invention is also an electromagnetic signals reception chain implementing the method as claimed in any one of the preceding claims, said chain comprising at least one low noise amplifier whose energy consumption is dependent on a setpoint defined by said method, an analog-digital converter converting the signals arising from said amplifier and a table containing values representative of the power level of received signals.

The reception chain comprises for example:
a mixer at the output of the low noise amplifier, said mixer mixing the signal arising from the low noise amplifier with a local oscillator signal, the energy consumption of said mixer being dependent on a setpoint defined by said method;
a filter filtering the mixed signal at the output of the mixer;
an amplifier whose input is linked to the output of the filter and connected at output to the input of said analog-digital converter, the energy consumption of said amplifier being defined by said method.

BRIEF DESCRIPTION OF THE DRAWINGS

Other characteristics and advantages of the invention will become apparent with the aid of the description which follows given in relation to appended drawings which represent.

DETAILED DESCRIPTION

Figure 1:
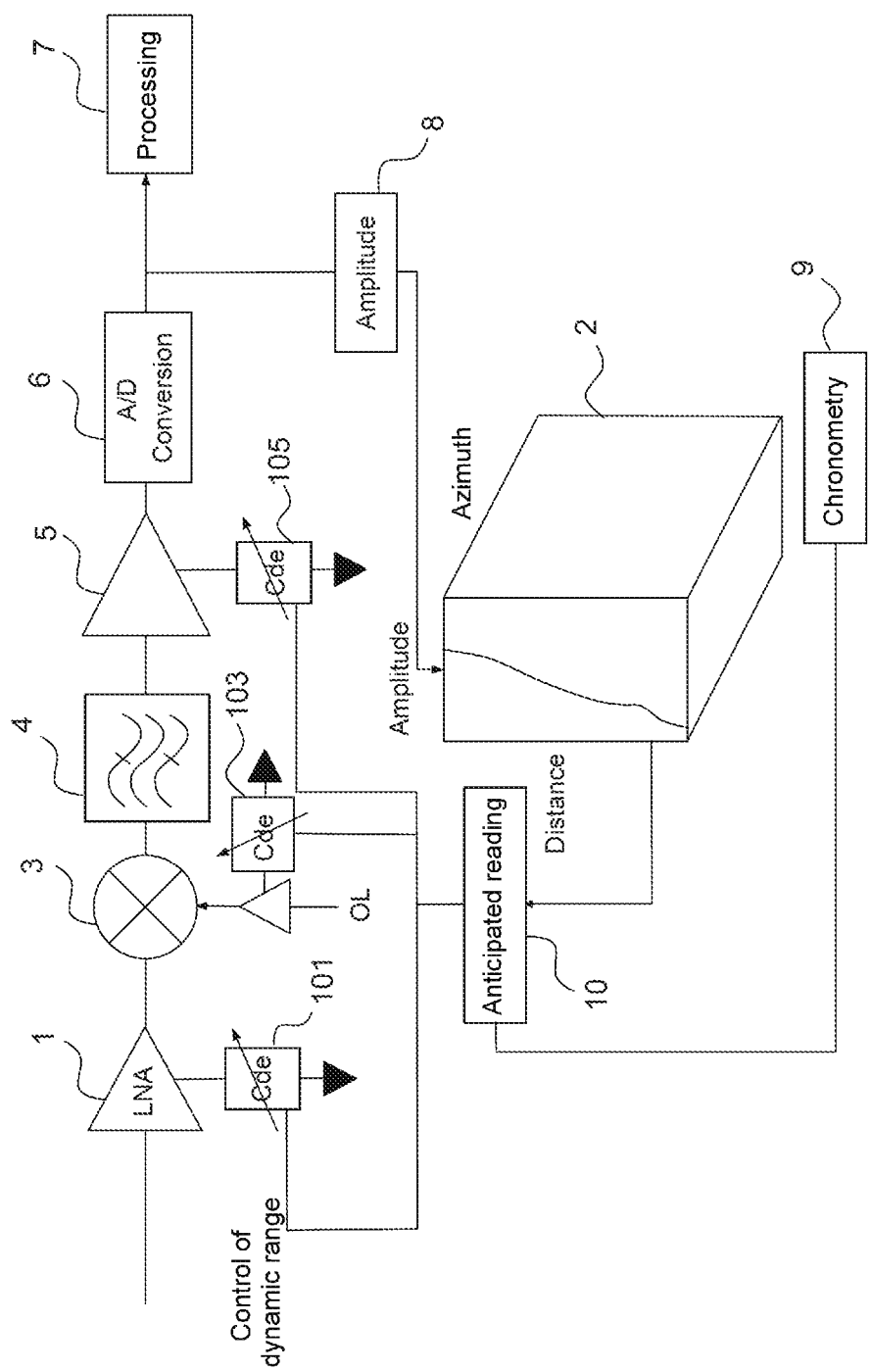
FIG. 1, an exemplary radar reception chain according to the invention.

FIG. 1 illustrates the operating principle of the invention. For this purpose, it describes an exemplary embodiment of a part of a, for example radar, reception chain. The device described comprises at input an amplifier LNA 1. The invention limits the significant consumption of energy, and also decreases the constraints induced by such consumption (generation and handling of the energy, cooling in particular), by making it possible to marry the advantages of the dynamic range, linearity and bandwidth, without excessive consumption. The principle of the solution afforded by the invention rests upon appropriate management of consumption, taking the linearity constraints into account solely in a case where strong signals occur. For this purpose, the amplifier LNA 1 behaves as a small-signals amplifier and switches to strong-signals amplifier in a case where a strong signal occurs. The invention optimizes the consumption of the LNA, increases the IP3 in case of necessity and protects the component by increasing its electrical supply voltage or removing its power supply. It is known that a component is protected as a function of the maximum voltage of its power supply. The higher and more robust its power supply, the more it consumes as was indicated previously. A device according to the invention uses a mapping, stored in a memory 2, of the signals external or internal to the component, and dynamically changes the mode of operation of the component 1 as a function of the signal level detected: weak signal or strong signal. This mapping is a model of the history of the received signals.

The bias current or the supply voltage is therefore dynamically adapted as a function of this level, that is to say in fact as a function of the operational need. For a component of bipolar type, it is possible to act on the bias current whereas for a component of MOS type it is possible to act on the supply voltage. For the subsequent description, the mapping will be likened to the memory which contains it. As will be seen subsequently, this mapping may be a three-dimensional table. The limit value separating a weak signal from a strong signal is determined a priori and may vary from one application to another. The component 1 whose consumption is to be optimized may be a low noise amplifier (LNA), but not solely.

If the levels of the signals are very high, to avoid saturating and thus getting harmonics which can no longer be circumvented, the supply voltage is increased dynamically so as to push the knee voltage as far back as possible, doing so as a function of the technology. The other parameter is the bias current which can also be adapted to push back the saturation limit. If the level of the signals is still more significant and risks damaging the component 1 through overheating, by exceeding a given threshold, the destruction of the component can be avoided by setting to zero or cutting off the power supplies. This earthing is maintained as long as the dangerous levels are present at the input of the component. These power levels are extrapolated by the method according to the invention which thus advantageously makes it possible to protect the components against power levels that could damage them.

To anticipate the level of the signals entering the component 1, an extrapolation is made as a function of the first recurrence of the burst of received signals, in the case of burst-wise operation. For continuous operation, a computation of the sliding mean amplitude and sliding standard deviation and then a setpoint based on the mean increased by K times the standard deviation is formulated, K being dependent on the statistics of the signals and the acceptance of the risk of saturation. An extrapolation from antenna revolution to antenna revolution can also be implemented, adjusted for the speed of the carrier and with the information about the statistics of the signals considered.

The description of the exemplary embodiment of FIG. 1 hereinafter illustrates the principle of the invention by detailing these functions in particular. In this example, the consumption of a low noise amplifier 1 is optimized.

The low noise amplifier (LNA) 1 is followed by a mixer 3. The latter receives on a first input the signal arising from the LNA and on a second input a signal at a so-called intermediate frequency. This is a case of heterodyne reception where the signal received is transposed via the mixer 3 to an intermediate frequency FI. The mixer output signal is therefore the reception signal brought to the intermediate frequency. This signal is for example filtered by a filter 4. An amplifier 5, termed the FI amplifier, is connected at the output of the filter 4 so as to amplify the signal arising from this filter. The FI amplifier is connected at output to an analog-digital converter 6. The digitized signal is taken into account by processing means 7. According to the invention, the LNA 1, and also other components of the chain, are controlled dynamically in terms of bias voltage or current as will be described subsequently to implement the optimization of consumption while ensuring good protection of the components. The dynamic control is dependent on the extrapolated output signal, the output signal being for example measured at the output of the converter 6. More particularly, a measurement 8 of the amplitude of the output signal is measured, this amplitude giving the information about the level of the signal. The optimization of the consumption of the LNA 1 is thus carried out as a function of the extrapolation of the output signal.

The LNA 1 must combine a low noise factor with a given gain and a high stability in a large frequency band, stability corresponding to an absence of oscillations. This type of amplifier is often in class A, with typically 20% of the useful current serving to bias the amplifier, so as to place the quiescent point at the center of the possibilities of evolution in terms of voltage and current while remaining in the linear zone.

A noticeable need in wideband low noise amplification circuits is not to saturate and to remain linear over a large dynamic range. This is to allow amplification of the small and of the large signals. The fact of having a very good noise factor, a large gain and stability over the whole of the frequency band while consuming little amounts to solving the squaring of the circle. Linearity has an energy cost since it demands a high supply voltage and large bias currents in order to remain in the linear zone. Perfect stability is achieved to the detriment of the gain. Significant IP3 levels impose large bias currents although the best noise factors are obtained with low currents. The problem is made more complex knowing that the temperature and the noise factor are in opposition, conveying the fact that the hotter the component the worse the noise factor. The parameters to be processed are the frequency band, the DC current and the offset in voltage with the dissipation, the stability and the gain, the matching at input and at output, and the decoupling of the power supplies to avoid noise referred to the level of the amplifier.

The noise factor Fb of an amplification chain is computed through the following formula:

$$Fb = Fb1 + \frac{Fb2-1}{G1} + \frac{Fb3-1}{G1.G2} + \ldots \quad (1)$$

Fb1, Fb2, Fb3 . . . being respectively the noise factors of the first chain, of the second chain, of the third chain and so on and so forth. G1, G2, G3 . . . are the gains associated respectively with these same chains.

Relation (1) shows that the noise factor of the first element of the chain Fb1 may be more or less predominant depending on the value of the gains, especially of the gain G1 of the first amplification chain. This gain G1 therefore plays a very significant role in respect of the noise factor Fb of the overall chain. The larger this gain, the more the risk of saturating the reception chain, but the better the noise factor Fb since the noise factors of the other chains are attenuated by G1. In the example of the device of FIG. 1, it is therefore the gain of the LNA 1 which is the key parameter.

The control of the LNA 1 must therefore arrange for the latter to remain within linear operation but overconsume only in the presence of strong signals. It is also necessary to optimize the noise factor when the signals to be received are very weak. The conditional engendering of high voltages or of high bias currents making it possible to retain this linearity can also be applied to the mixer 3 as well as to the other circuits of the chain, making it possible to optimize the consumption of these circuits. An extrapolation can also make it possible to cut off the power supplies in case of dangerous, overly high input power. The input powers cause heating of the LNA 1 bringing about its destruction. The detection of the temperature rise is too slow to protect the component. The detection of the output power, obtained through the measurement 8 of the amplitude of the output signal, and its extrapolation makes it possible to cut off the power supplies sufficiently early, in a dynamic manner, and therefore to effectively protect the LNA.

The dynamic control of the LNA 1 and of the other components is now described. A variable control circuit 101 is associated with the LNA. Through this control 101 it is possible to vary the drain current or the supply voltage of the LNA. Voltage-based control can be carried out by a simple selector, for example switches based on FET transistors, MEMs or any other known switching system. Current-based control can be rendered variable by resistance short-circuit with the aid of FET transistors or of MEMs or any other device, by Zener diodes or any other known current-based control system, discrete or continuous control.

In order to illustrate the advantages afforded by the invention, a GaN technology LNA is considered.

Figure 2A:
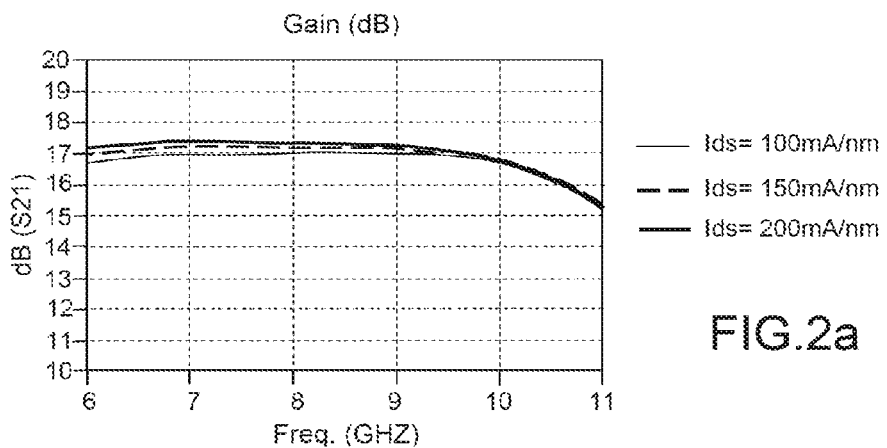
FIGS. 2a, 2b and 2c, curves illustrating respectively the variation of the gain in power, of the noise factor and of the linearity performance.
Figure 2B:
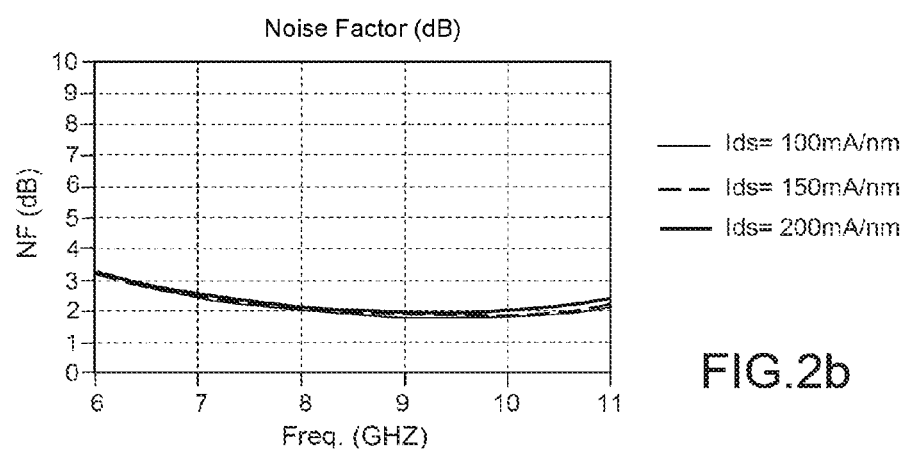
Figure 2C:
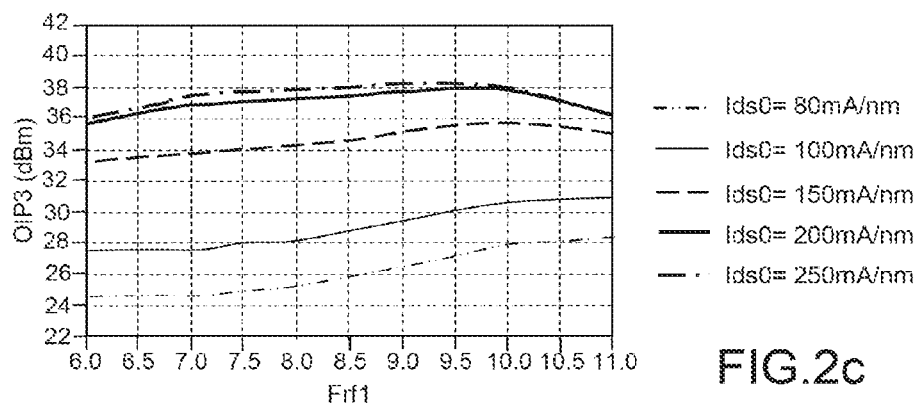

FIGS. 2a, 2b and 2c show by curves respectively the variation of the gain in power, of the noise factor and of the linearity performance (OIP3) as a function of the bias current, more particularly of the drain current Ids, expressed in mA. For each figure, a curve corresponds to a level of current Ids. All these curves are given for a given supply voltage of the LNA. The invention advantageously utilizes the results illustrated by these curves.

The curves of FIG. 2a represent the transmission gain, corresponding to the coefficient S21 of the transfer function of the LNA, expressed in dB as a function of frequency. FIG. 2a presents by way of example three curves corresponding to Ids=100 mA, Ids=150 mA and Ids=200 mA.

The curves of FIG. 2b represent the noise factor (NF) expressed in dB as a function of frequency for these same three values of bias current.

The curves of FIG. 2c present the linearity performance represented by the quantity IP3, expressed in dBm, as a function of frequency. FIG. 2c comprises five curves corresponding to the following five values of the bias current Ids: 80 mA, 100 mA, 150 mA, 200 mA and 250 mA.

These curves clearly show that the gain and noise performance are only very slightly affected by the modifications in consumption, dependent on the current Ids, whereas a dynamic range of more than 10 dBm is observed in the IP3. It will be possible to alter the bias voltage of the LNA, by switching it from one value to another as a function of the expected linearity performance, by extrapolation.

To be effective, the reaction times of the LNA to pass from one bias current level to another must not exceed a few tens of nanoseconds, this depending nevertheless on the type of application.

Figure 3A:
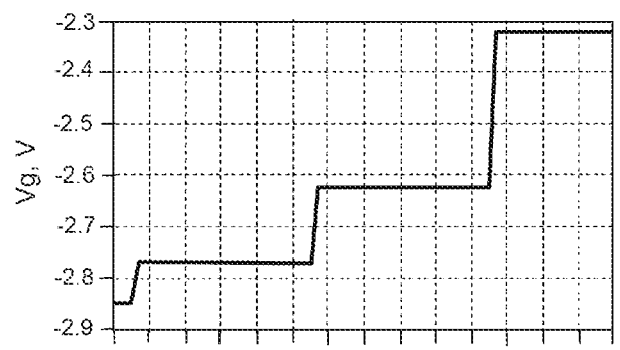
FIGS. 3a and 3b, an illustration of the switching of the signal for several levels of bias voltage of a low noise amplifier.
Figure 3B:
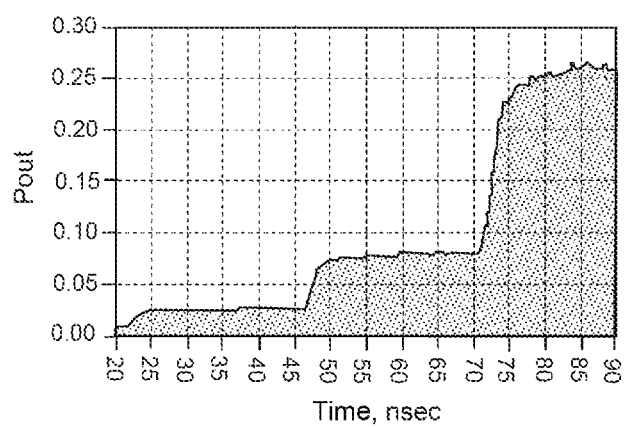

FIGS. 3a and 3b illustrate the switching of the signal for several levels of bias voltage of the LNA. FIG. 3a illustrates the relative voltage level by a time-dependent staircase curve. At each instant at which the transistor is no longer linear, we pass to the higher voltage level, the bias current Ids and the bias voltage being chosen in such a way as to operate linearly with the lowest possible power. The power at the output of the LNA is illustrated in FIG. 3*b*; the power increases with the bias voltage.

To avoid any saturation, damaging in a radar sensor or in an ESM, it is necessary to anticipate at each recurrence the operating point so as to avoid having tail-off and saturation on weak signals.

Several predictive solutions can then be envisaged:
  Directly control the voltage of the LNA 1 and its bias current with a transfer function of the output signal; in this case the bias current margin must be sufficient for the edges of the signal not to be saturating;
  Extrapolate the variations of the output signal so as to predict the future variations of the input signal and thus adapt to the apposite necessary linear dynamic range, with a minimum safety margin for linearity;
  Use output signal detection thresholds to change the values of the bias current and of the input voltage in such a way that the safety margin guaranteeing a linearly amplified signal is complied with.

The possible evolutions of the input signal (its bandwidth) make it possible to ascertain the maximum possible slopes. The envisaged gains are dependent on the mean level of the received signals. As a general rule, these signals do not require significant linearity since their dynamic range is small for more than ¾ of the time. The expected gains are therefore more than a factor of 3 with respect to the initial consumption. This makes it possible to dimension the power supplies and the cooling accordingly.

A complementary solution consists in using the stationarity of the signals from one recurrence to another. Significant variations in dynamic range are rare from one recurrence to another at the same distance bin and it is for example possible to use the amplitude information of the previous recurrence, or a transfer function of the previous recurrences for a programming of the dynamic range of the reception chain making it possible to best tailor the consumption.

This function is significant for active antennas where the formation of the reception beam by phase shifters of the amplitude modulators is dimensioned for the worst case, thereby bringing about an overconsumption multiplied by the number of modules necessary for the formation of the beam. An optimization of this chain therefore brings about very significant gains in the energy implemented.

Returning to FIG. 1: the amplitude of the signal at the output of the converter 6 is therefore measured 8. More particularly, the digitized value at the output of the converter is sampled at each recurrence. This level of the output signal is then an input datum of the mapping 2. As a function on the one hand of the value of the received signal at the current recurrence, which value is given by the measurement 8, and on the other hand of a time measurement, given by a chronometry device 9, anticipated reading of the signal of the next recurrence can be carried out. In the case of a radar application, this reading 10 is done by processing means, for example a computer. This anticipated reading is in fact an estimation or prediction of the value of the next received signal. The control of the gain of the LNA 1 in terms of supply voltage or bias current depends on this anticipated reading. Stated otherwise, the variable control circuit 101 delivers this voltage or this current to the LNA as a function of this anticipated reading. Such a circuit 101 may be a controllable voltage source or current source, the control arising from the processing means.

This optimization of the control of the LNA 1 can be supplemented with an optimization of the energy consumption of the amplifiers 104, 105 serving to carry out the mixing and the amplification of the signals at intermediate frequency, this intermediate frequency being generated by a local oscillator OL. Thus just as for the LNA 1, a variable control 103 is applied to control the intensity of the local oscillator signal OL entering the mixer 3; more particularly this control is applied to the amplifier 104 amplifying the level of the signal arising from the local oscillator, the output of the amplifier 104 being linked to one input of the mixer, the other input of the mixer being linked to the output of the LNA 1. Just as for the latter, the control 103 is applied to the bias current or to the power supply of the amplifier 104.

Thus, to avoid any saturation, the pathway OL is amplified 104 to the maximum and the mixer 3 is therefore used in its linear zone. This constraint of amplification of the pathway OL is not warranted for small signals. An adapted amplification can then be carried out according to the same criteria as those applied to the LNA. In the exemplary embodiment of FIG. 1, is used as input signal of the variable control 103 of the pathway OL the same input signal as for the variable control 101 of the LNA, that is to say arising from the detection and from the extrapolation of control of bias and of power supply of the LNA, dependent on the mapping 2. Likewise, a variable control 105 is applied to the amplifier 5 at the output of the filter, in terms of bias current or supply voltage, according to the technology.

In fact the variable controls apply 101, 103, 105 an energy consumption setpoint setpoint to the components, this setpoint being able to be applied either through a supply voltage setpoint, or through a bias current setpoint. The setpoint value is applied as a function of the extrapolated or anticipated value 10, defined on the basis of the history contained in the table 2. Which setpoint to apply is known as a function of this extrapolated value, especially as a function of the operating characteristics of the components.

In the case of an agile scanning radar, overall control of the whole of the reception chain while taking into account the previous recurrence or the recurrence from antenna revolution to previous revolution, coupled with an extrapolation as a function of the distance bins makes it possible to generate a general control for adapting the dynamic range. The general control signal is for example applied to the previous variable control circuits 101, 103, 105.

Figure 4:
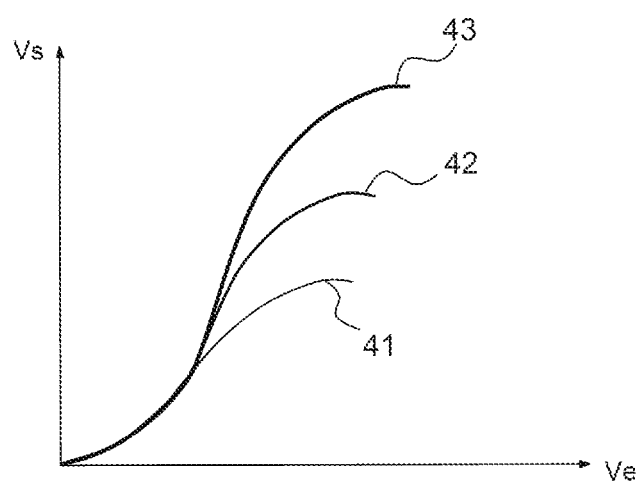
FIG. 4, an illustration of the output signal Vs as a function of the input signal for various values of supply voltages and of bias current of a low noise amplifier.

As a function of the supply voltage and drain current, the saturation level evolves according to different curves as shown by FIG. 4. Three curves 41, 42, 43 represent the output signal Vs as a function of the input signal for various values of supply voltages and of bias current (drain current).

When the saturation is pushed back to the maximum limit 43, the consumption is also a maximum. Optimization of the parametrization in terms of current and voltage is therefore possible on condition that there is a short reaction loop and that it is possible to anticipate the moments requiring a large dynamic range. The consumption may for example vary by a factor of 6 as a function of the dynamic range to be processed.

Statistically the dynamic ranges of the signals to be processed are saturating for only a few percent of the time, about 10%. Dimensioning a reception chain in the worst case, as is generally done in the solutions of the prior art, is therefore not optimum. It is possible to define thresholds of dynamic ranges or to vary the control 101, 103, 105 continuously so as to adapt to the desired dynamic range. In this case, the computation of a sliding mean and of a sliding standard deviation can be used to select the appropriate threshold which may be related to the mean and to a multiple of the standard deviation. The choice of the coefficient of the multiple depends on the tolerance to saturation that is accepted for the desired consumption performance. This is a compromise which may itself be changeable and evolve in an a posteriori dynamic manner. Comparison of this value with a set of thresholds or continuous control of the current are then possible.

Another possibility consists in storing all the values of dynamic range in the memory map, containing the mapping 2, during the first antenna revolution and thereafter applying a function of this dynamic range map to choose the best-adapted function which optimizes the consumption, that is to say the closest to the saturation threshold.

This memory map is addressed through the measured value 8 of the received signal on the one hand and through the radar distance and azimuth information on the other hand. An adjustment is performed as a function of the motions of the radar carrier, the adjustment being performed for example by a sliding of the addresses as a function of the displacement. Indeed, the signal power level predicted for the following recurrence depends on the last measured value 8 of the received signal (dynamic range), the distance to the target and the azimuth of the target. This predicted value can be predetermined and accessible via the addresses dependent on these three parameters. Thus, the predicted value is in a memory bin whose address depends on the measured value 8, the azimuth and the distance of the target. To take account of the motion of the carrier and of its incidence on the power level of the received signal, we shift toward other memory bins, according to the two dimensions, distance and azimuth. The number of addresses shifted in distance and azimuth depends on the speed of the carrier. The granulometry of the memory map depends in particular on the degree of optimization of the consumption desired. This granulometry corresponds to the degree of sampling of the physical quantities addressing the values stored in the memory map, the triplets of addresses being the sampled values. These quantities are the measurement 8 of the received signal, the distance of the target and its azimuth.

As a function of the distance and of the azimuth of the detected target, it is therefore possible to predict the level of the next received signal. The granularity of this memory map depends moreover on the degree of optimization of the consumption desired.

The complete reception chain 1, 3, 4, 5, 6 can be parametrized as a function of the estimated dynamic range. The attack of the mixer 3 by a saturating level, which is compulsory in order to avoid undesired harmonics, may also be done in a manner proportional to the desired dynamic range.

The reading of the memory map 2 containing the dynamic range or a transfer function of the latter, temporally adjusted, makes it possible to anticipate the levels of future received signals, without too much risk of saturation, and makes it possible to reach a compromise between the optimum consumption and the absence of saturation desired. As indicated previously, compensation for the speed of the carrier must be performed so as to adjust the measurements as a function of the new position in the case of a mobile carrier.

It is also possible to use the first recurrence of a burst to dimension the dynamic range. The first recurrence of a burst with frequency agility is generally not utilized, in particular because of thermal instability problems related to the changes of mean power of the emission transistors. It is possible to use this first recurrence to calibrate the dynamic range levels received. Presetting the drain current to the maximum value makes it possible to avoid any risk of saturation. The digitized value can then be applied in the table 2, forming the mapping, so as to match the control of the desired drain current, that is to say the consumption, with the amplitude of the signal composed of the fixed signal and of the moving signal.

In continuous operation, the aim is to be as close as possible to the foreseeable dynamic range. To avoid the use of a clutter map, a transverse computation can be established. To a first approximation, the first emitted recurrence is taken as reference. The processing then consists in feeding an azimuthal filter making it possible to extrapolate the maximum dynamic range while minimizing the risk of saturation and while being as close as possible to the optimal consumption. A transverse computation of the sliding mean over for example half the width of the antenna lobe, twinned with a computation of the standard deviation (for the processing of the moving echoes), by distance slices. The fineness of a slice depends on the optimization level sought; this may extend to a computation per distance bin. The saturation threshold, that is to say the bias current of the transistors, is for example fixed with respect to the mean increased by a multiple of the standard deviation in absolute value.

The variations of dynamic range in absolute terms have to be optimized as a function of the risk of amplitude variation of the levels of the small signals. An application of the change of the setpoint is for example effected as a function of the sampling instant, if possible on falling edge of the clocks of the coder 6 (assuming that the coding is done on rising edge), in such a way as to minimize the risks of fluctuation in level, related to glitches and to changes of state.

The setpoint to be applied in a bin N, for the mean is:

$$/X = \sum_{N-l/2}^{N} \frac{Ai}{\frac{l}{2}}$$

for the standard deviation is:

$$\sigma_N := \sqrt[2]{\frac{2}{l} * \left(\sum_{N-1=\frac{l}{2}}^{N} (Ai)^2\right) - /X^2}$$

Where:
  l is number of recurrences in the antenna lobe;
  /X is the sliding mean over the antenna half-lobe;
  $\sigma_N$ is the sliding standard deviation over the antenna half lobe;
  Ai is the amplitude of the signal of rank i, measured 8 at the output of the coder 6.

The dynamic range considered is for example the sliding mean value plus 2 to 3 times the sliding standard deviation in the distance bin considered. Approximations to facilitate the computation may be envisaged such as:
  the computation of the maximum of the sliding signals in the bins instead of the mean;
  a multiple of the difference between the sliding minimum amplitude and the sliding maximum amplitude can be taken instead of the sliding standard deviation;
  the sliding sum of the absolute values of the differences.

In a minimalistic solution, the setpoint may be based on the previous recurrence plus a fixed heel corresponding to the amplitude of the moving signals and the variation in the antenna lobe gain.

One of the advantages of such a design is in particular that it makes it possible to dimension the power supplies on the mean level of the signals, integrated in the whole of the antenna revolution. The same holds for the dissipation which can be optimized by virtue of this function.

If the dimensioning is done for this value, this corresponds to about a third of the dissipated power and therefore of the need in terms of power supply of the reception function.

The invention claimed is:

1. A method for managing an energy consumption of at least one electronic component in a radar reception chain comprising a preliminary step of formulating a table that is stored in a memory containing values representative of a power level of received signals, each of said values being contained in a bin addressed at least by a triplet formed of a quantity corresponding to a measurement of the power level of a signal received from a target, of a quantity corresponding to a distance of said target, and of a quantity corresponding to an azimuth of said target, said method performing for each received signal, arising from a radar recurrence of order n, the following steps:
a step of a reading of a measurement of the power level of the received signal with an amplitude measurement device;
a step of addressing said table stored in the memory as a function of said measurement, of the distance and of the azimuth of said target, a first power level value then being addressed;
a step of extrapolating the power level of the next received signal arising from a following radar recurrence of order n+1 with a processor, dependent on a first value and on a given number of values of said table stored in the memory and addressed by sliding of addresses from the address of said first value according to the power level measurement addresses, said given number being dependent on a speed of a carrier of said reception chain, said step of extrapolating the power level being applied for the received signal of order n+1,
determining a setpoint value of the energy consumption of said at least one electronic component dependent at least on the extrapolation of the power level received and a position of said target, and
controlling with a controller the energy consumption of said at least one electronic component based on the setpoint value of the energy consumption.

2. The method as claimed in claim 1, wherein the signals being received by recurrences, per burst and/or per revolution of antenna coupled to said reception chain, said table comprises values representative of the power level of signals received in a previous recurrence, in a previous burst and/or in previous antenna revolutions.

3. The method as claimed in claim 1, wherein the quantities of the triplet being sampled values of measurement, of the distance and of the azimuth.

4. The method as claimed in claim 1, wherein the addresses are shifted in distance and in azimuth according to motions of the carrier of said reception chain.

5. The method as claimed in claim 1, wherein the extrapolation is equal to a mean amplitude of a first addressed value and of M values addressed from the table by address sliding, increased by K times a sliding standard deviation, wherein K is dependent on statistics of the signals and acceptance of a risk of saturation.

6. The method as claimed in claim 1, wherein a consumption setpoint is determined by a setpoint of a supply voltage of said at least one electronic component.

7. The method as claimed in claim 1, wherein a consumption setpoint is determined by a setpoint of a bias current of said at least one electronic component.

8. The method as claimed in claim 1, wherein a power supply of said at least one electronic component is set to zero when said power level exceeds a given threshold.

9. The method as claimed in claim 1, wherein said at least one electronic component is a low noise amplifier.

10. An electromagnetic signals reception chain implementing the method as claimed in claim 1, comprising at least one low noise amplifier whose energy consumption is dependent on the setpoint value of the consumption of said at least one electronic component defined by said method, an analog-digital converter converting the signals arising from said amplifier, and the table containing values representative of the power level of received signals.

11. The reception chain as claimed in claim 10, further comprising:
a mixer at the output of the low noise amplifier, said mixer mixing the signal arising from the low noise amplifier with a local oscillator signal, the energy consumption of said mixer being dependent on the setpoint value of the consumption of said at least one electronic component defined by said method;
a filter filtering the mixed signal at an output of the mixer;
an amplifier whose input is linked to an output of the filter and connected at an output to an input of said analog-digital converter, the energy consumption of said amplifier being defined by said method.

* * * * *